3,444,278
METHOD FOR PRODUCING A FILTER CARTRIDGE
Rudolfs A. Ozolins, St. Marys, Ohio, assignor to Leo B. Janis, Toledo, Ohio
No Drawing. Continuation of application Ser. No. 316,157, Oct. 14, 1963. This application Dec. 22, 1966, Ser. No. 604,062
Int. Cl. B01d *39/20;* B32b *1/08, 3/18*
U.S. Cl. 264—42    2 Claims

ABSTRACT OF THE DISCLOSURE

A method for producing a filter cartridge having an inner previous mass of calcium oxide particles enclosed within an outer calcium carbonate shell. The method involves placing a calcium hydroxide slurry in a perforate mold, exposing the surface of the slurry to atmosphere until the calcium carbonate skin forms, while keeping at least the inner portions of the slurry wetted, separating the mold from the formed outer shell and wetted interior, and drying the wetted inner mass of calcium hydroxide particles.

---

This is a continuation of application Ser. No. 316,157, filed Oct. 14, 1963, and now abandoned.

A problem in maintaining marine plant and animal life in captivity for biological or commercial purposes has been to provide, in an aquarium or tank, a constant water supply free of harmful bacteria and chemical impurities which may be present in the water available at the site of the aquarium or tank. While it may be possible in extensive installations to maintain water treating systems for properly conditioning artificial fresh or salt water to remove undesirable chemical impurities, to kill living microorganisms such as bacteria and fungi, and to maintain required chemical constituents; an inexpensive filter system is especially desirable for use in installations such as aquariums and tanks used to keep marine plant and animal life alive for short periods of time. An example of the latter type of installation would be a salt water tank in a restaurant used for keeping lobster and other marine animals alive prior to their use. Heretofore, it has been impractical for small institutions to provide a large water treatment plant and, therefore, it has been impossible for them to provide an artificial water supply capable of maintaining certain marine life such as lobsters and other desirable marine food animals alive longer than a very short period, e.g., two or three days. Therefore, restaurants and other installations located more than a day's rail distance from the salt water source of such marine animals are required to air-ship their supplies, which increases the cost to them and to the ultimate consumer.

It is therefore an object of this invention to provide an inexpensive and compact filter medium for use in water purification, and capable of removing undesirable chemical impurities.

It is another object of this invention to provide an inexpensive and compact filter medium for use in water purification which is capable of killing undesirable living microorganisms such as bacteria and fungi.

It is a further object of this invention to provide an inexpensive and compact filter medium for use in purifying water which is capable of removing certain organic impurities by coagulation.

It is still another object of this invention to provide an inexpensive and compact filter medium which is chemically active, and yet which has an outer shell which is substantially insoluble in water so that the filter cartridge itself may be used without reinforcing or encasing means to prevent the filter medium from washing away with the flow of the water.

Other objects and advantages will be apparent from the description which follows and is intended only to illustrate and disclose but in no way to limit the invention.

It has been discovered that an inexpensive filter medium consisting of an inner portion of calcium oxide or hydroxide particles enclosed by a previous outer shell of calcium carbonate is very effective in removing undesirable mineral impurities and in killing living microorganisms such as bacteria and fungi present in untreated water. In one embodiment, therefore, which will first be described in detail, the invention is concerned with such a filter. The calcium oxide, CaO, when wetted with water, forms calcium hydroxide, $Ca(OH)_2$. When the untreated water flows through a bed of calcium hydroxide, it has been found that undesirable living microorganisms are killed due to the very alkaline conditions present.

The free calcium ion, $Ca^{++}$, is an excellent coagulant for removing undesirable mineral impurities and organic matter present in the water. The calcium ion is excellent for this purpose because of the low solubility of products formed by the union of the calcium ion with the negatively charged particles present in the water. Thus the presence of the calcium hydroxide in the filter also provides the chemically active element for coagulating or precipitating mineral (e.g., sulfate anions) and organic impurities present in the water supply.

One disadvantage in using calcium hydroxide as the chemically active element in a water filter medium stems from the ready solubility of calcium hydroxide in water. A filter of calcium oxide, when wetted, forms soluble calcium hydroxide, which dissolves and causes the relatively rapid physical breakdown of the filter. To prevent such rapid breakdown, in accordance with this invention, the filter medium of calcium oxide is provided with an outer shell or skin of calcium carbonate, $CaCO_3$, which is highly insoluble. This outer shell or skin, of $CaCO_3$, which is pervious to water but impervious to particles of calcium oxide, serves to retain the calcium oxide particles within the shell and to give the filter cartridge physical integrity, even when wet.

A very pure grade of calcium oxide, CaO, such as Reagent Grade, is preferable for use in producing a filter according to this invention. It has also been found that the use of comparatively fine calcium oxide particles, e.g., 200 to 325 mesh, U.S. Sieve Series, is preferable, although even coarse particles can be charged, and broken down by thorough mixing with water, so that sufficiently small pores are formed in the final filter. In carrying out the invention, the CaO particles are wetted with water to form a slurry of calcium hydroxide. The slurry is next placed in a suitable mold to form a filter cartridge of desired dimensions. The mold should be perforated to allow the passage of air but not to allow the calcium hydroxide slurry to leak out. The mold containing the calcium hydroxide slurry is then exposed to the atmosphere for a period sufficient to permit the carbon dioxide present in the atmosphere to react with the outer surface portions of the calcium hydroxide slurry contained in the mold while the inner portions remain wetted. Contact with $CO_2$ during this drying period causes an outer shell of calcium carbonate, $CaCO_3$, to form around the inner portions of calcium hydroxide. Thereafter the filter is thoroughly dried in an environment free of carbon dioxide so that the inner portion is composed substantially of calcium oxide.

It has been found that the initial drying step during which the outer shell of calcium carbonate is formed can be accelerated by increasing the amounts of carbon dioxide present in the drying environment, thus accelerating the conversion of calcium hydroxide to calcium carbonate.

It has also been discovered that a filter medium of this invention which has a mixture of calcium oxide particles and activated charcoal particles surrounded by a porous outer skin of calcium carbonate also gives excellent results. Activated charcoal is, of course, an excellent filler medium and in this environment, when mixed with the particles of calcium oxide in the inner portion, serves to strengthen the filter cartridge. It has been discovered that optimum results may be obtained by using up to about 20% by weight of activated charcoal in the filter medium of this invention.

A specific example of the method of producing a filter medium of this invention is as follows: 40 pounds of reagent grade calcium oxide were mixed with 10 pounds of activated charcoal and 50 pounds of water to form a paste. A tubular-shaped filter cartridge was formed in a mold having a perforate cylindrical outer shell and a hollow perforate concentric inner core. In this specific example, the mold consisted of a pair of concentric cardboard tubes, the outer tube about 4 inches in diameter and the inner tube about 1 inch in diameter. The mold containing the paste was then exposed to the atmosphere at room temperature for a total of about four days and was kept moist during this time to enable a pervious outer shell of calcium carbonate to form by reaction with carbon dioxide in the atmosphere. An inner shell of calcium carbonate also forms around the perforated central core, due to the presence of atmosphere and carbon dioxide within the central core. Thereafter, for about three days, the entire assembly was subjected to infrared heat, at about 200° F., and, to cause drying and to form a tubular filter cartridge having a pervious inner portion of calcium oxide enclosed by pervious inner and outer shells of calcium carbonate and with a calcium carbonate skeleton extending through the calcium oxide between the inner and outer shells.

The tubular filter cartridge thus formed can be inserted in a water filtering system wherein the water is caused to flow radially inwardly from the outside surface, through the cartridge, and into the central core. Such a cartridge may be encased in a fibrous or perforate outer shell to provide additional reinforcing or may be used by itself since the relatively insoluble calcium carbonate shell provides physical strength. Use of an outer fibrous casing such as cardboard or suitable filter paper may provide means for pre-filtering larger particles of sediment and other mechanically filterable impurities before they reach the filter cartridge itself.

It is to be understood that the filter cartridge of this invention may be formed in any convenient physical shape, such as the tubular cartridge described above or a disc-shaped filter as desired.

It is also to be understood that it may be desirable to use a matrix of inert fibrous material such as asbestos, cellulose fibers, etc. throughout the inner and outer layers of the filter of this invention. Use of such materials may increase the rate of water flow through the filter and also may give physical strength to the filter cartridge structure.

The remarkable filtering properties of the filter medium of this invention have been demonstrated by its use in a water-filtering system for an aquarium for lobsters. Substitution of the filter of this invention for another commercially available filter increased the average life expectancy of fifty lobsters in a fifty gallon aquarium from four to sixteen days due to its excellent performance in killing undesirable living micro-organisms which have been found to be fatal to lobsters. It is further pointed out that the filter of the instant invention, which supplies calcium ions to the water passing through it, is especially useful in installations for maintaining lobster and other crustacea since such forms of marine life absorb relatively large amounts of calcium to maintain their shells. Thus, the filter of the instant invention is particularly adapted to use in installations of this nature.

The invention has heretofore been discussed with specific reference to a filter produced by hydrating calcium oxide particles. It will be apparent that calcium hydrate could be used equally well as the starting point, and that reactions other than that between calcium hydroxide and carbon dioxide from the atmosphere could be utilized to form pervious skins confining the filter medium. For example, the wet filter mass comprising calcium hydroxide particles could be exposed to an $SO_3$ atmosphere to form pervious skins and a skeleton of calcium sulfate dihydrate. Calcium carbonate skins and skeleton are preferred, however, because of the greater insolubility of the carbonate in water. Barium and strontium oxides and hydroxides can also be used in a similar manner, but calcium oxides or hydroxides are preferred for economic reasons, and also because a chemically active filter according to the invention introduces metal cations into the water filter, and it is usually preferred to introduce calcium cations rather than either barium or strontium cations.

It will be apparent that various changes and modifications can be made in the specific details discussed above and described in the example without departing from the spirit of the attached claims.

I claim:

1. A method of producing a filter cartridge having a pervious inner mass of calcium oxide particles surrounded by a pervious outer shell of calcium carbonate, said method comprising (1) forming a slurry of calcium hydroxide, (2) placing said slurry in a perforate mold, (3) exposing the surface of said slurry to atmosphere a sufficient period of time and at a sufficient temperature to form an outer calcium carbonate shell, while at the same time keeping at least the inner portions of the slurry wetted, (4) separating said mold from the formed outer shell and wetted interior, and (5) drying the wetted inner mass of calcium hydroxide particles to form a mass of calcium oxide particles surrounded by a pervious outer shell of calcium carbonate.

2. The method of claim 1 wherein the outer calcium carbonate shell of the cartridge is formed by exposure to an environment which has a sufficiently high carbon dioxide partial pressure to cause an acceleration of the formation of said calcium carbonate outer shell.

References Cited

UNITED STATES PATENTS

| | | | |
|---|---|---|---|
| 1,638,803 | 8/1927 | Gibson et al. | 210—500 X |
| 2,000,197 | 5/1935 | Smith | 210—500 X |
| 2,317,961 | 4/1943 | Tschirner | 210—502 X |
| 2,423,702 | 7/1947 | Hart | 210—502 X |
| 2,788,128 | 4/1957 | Heine. | |
| 3,048,537 | 8/1962 | Pall et al. | 210—510 |
| 3,156,648 | 10/1964 | Brucken et al. | 210—510 X |
| 3,170,872 | 2/1965 | Balogh et al. | 210—446 X |

FOREIGN PATENTS

| | | |
|---|---|---|
| 44,534 | 1/1888 | Germany. |
| 1,415 | 1/1884 | Great Britain. |

REUBEN FRIEDMAN, *Primary Examiner.*

W. S. BRADBURY, *Assistant Examiner.*

U.S. Cl. X.R.

210—501, 502, 503, 510; 264—82